Patented Oct. 17, 1933

1,930,503

UNITED STATES PATENT OFFICE 1,930,503

PREPARATION OF POROUS SILICIOUS MATERIAL

Abraham Sidney Behrman, Chicago, Ill., assignor to General Zeolite Company, Chicago, Ill., a corporation of Illinois No Drawing. Application February 21, 1929
Serial No. 341,845

4 Claims. (Cl. 23—113)

This invention relates to porous silicious gels and methods of preparing the same. It more particularly relates to those gels which may be termed zeolites or base exchange silicates and which have the property of removing the calcium and magnesium ions from solutions and replacing them by alkali metal ions.

An object of this invention is to provide an improved base exchange silicate or a zeolite.

Another object of this invention is to provide an improved manner of preparing base exchange silicates or zeolites.

A further object of this invention is to provide improved methods of proportioning the reagents and of preparing the reaction mixtures for the production of gel-like base exchange silicates or zeolites.

A still further object of this invention is to provide a base exchange silicate gel of decreased density and increased base exchange capacity, which capacity will be more uniform with waters of varying degrees of hardness and with varying rates of flow.

Other objects will appear during the course of the following disclosure.

The base exchange silicates of the present invention are most desirably prepared by reacting together a solution of amphoteric oxide or hydroxide and a solution of a soluble silicate. The concentrations, proportions, temperatures, and other conditions are preferably so adjusted that a gel or jelly will be formed embracing all, or the major portion, of the constituents of the reaction mixture.

In accordance with the present invention nonzeolite forming, salt-producing reagents, such as strong acids and alkalies are added to the reaction mixture at the same time or at different times before or during the gel formation, whereby a neutralization reaction occurs between said reagents simultaneously with the formation of the zeolites. These salt-forming reagents may be added to the amphoteric and silicious reagents before such reagents are intermixed to cause the formation of a silicious gel or jelly, the essential factor being a simultaneous reaction. Gels or jellies embracing a major portion or substantially all of the reaction mixture will usually contain about 90% or more of uncombined water, will possess a dry, leathery surface, exhibit marked resilience, and will support considerable weight, offering a marked resistance to penetration. The gel or jelly as formed is broken up, dehydrated and then washed to remove soluble salts therefrom. The dehydration operation may be carried out by drying with air or with combustion gases, preferably of a temperature less than 100° C. Frequently the drying operation is preceded by other dehydration operations such as draining, exuding or pressing.

In the following specific example, to which the invention is by no means restricted, sodium silicate is given as the preferred source of silica and aluminum sulphate as the preferred source of the amphoteric metal oxide, but it is to be understood that other silica yielding materials and other amphoteric metal compounds may be utilized. The sodium silicate and aluminum sulphate available do not contain the proportions of soda and silica and of alumina and sulphuric acid, required to produce the desired amount of soluble salts, and non-zeolite forming salt producing reagents, such as sodium hydroxide and sulphuric acid, are added to the solutions of sodium silicate and aluminum sulphate before or just as they are being intermingled. Other soluble salt-producing reagents than sodium hydroxide and sulphuric acid may be utilized.

As a specific example 7½ gallons of solution containing 1.81 lbs. of commercial sodium silicate per gallon and 0.314 lbs. of caustic soda per gallon is prepared, and mixed with 7½ gallons of a solution containing 0.716 lbs. of aluminum sulphate per gallon and 0.191 lbs. of sulphuric acid per gallon. The commercial sodium silicate is of 42° Bé. and contains about 9.7% sodium oxide $Na_2O$ and 29.6% $SiO_2$. The aluminum sulphate is somewhat basic and contains about 18% of $Al_2O_3$ and 47% of $H_2SO_4$. The caustic soda used is about 98.5% pure and the sulphuric acid is 66° Bé. and contains about 93.7% $H_2SO_4$. These solutions are mixed at room temperature or at lower temperatures depending upon the desirability of obtaining rapid or slow gelation. At the concentrations specified, if the intermixture and temperature are satisfactorily controlled, a gel or jelly will be formed embracing a major portion, or substantially all, of the total reaction mixture.

This gel or jelly may be dried with warm air, preferably not over 100° C. or with clean waste combustion gases containing carbon dioxide or other acid components. Before drying, the gel may be partially dehydrated by breaking it up and allowing it to exudate and/or pressing it in a hydraulic press. After the gel has been dried completely or partially, it is dumped into water and the soluble impurities are removed by washing. This gel will have a base exchange capacity of about 18 to 25 thousand grains per cubic foot as compared to previous capacities of 9 to 12 thousand grains per cubic foot. On the other hand its density will be less around 40 to 45 lbs. per cubic foot as compared to 50 or 55 lbs. per cubic foot. A most advantageous quality of the gel, prepared according to the process of this invention, resides in the fact that its exchange capacity is much more readily available than in the case of previously utilized zeolites. As a result there will be a smaller decrease in capacity with very hard waters or at high rates of flow.

The two solutions, which are reacted together above, may be considered as solutions of a single component, instead of solutions of two components. The first solution may be considered as a solution of sodium silicate in which there are one and a third moles of silica to every mole of soda. This ratio may be caused to vary between 0.5 to 1.9 moles of silica, or more preferably between 1 to 1.5 moles of silica, to every mole of sodium oxide. The second solutions may be considered to be a solution of aluminum sulphate of increased acidity, containing about 4.2 moles of sulphur trioxide or sulphuric acid to every mole of alumina, which corresponds with about 1.4 acid equivalents to each equivalent of amphoteric metal oxide or hydroxide. The moles of sulphuric acid may vary between 3.3 to 6 for every mole of alumina. If silicate and alumina solutions of these proportions are obtainable, it would be unnecessary to add caustic soda or sulphuric acid, but usually such solutions or compositions are not readily obtainable. The caustic soda and sulphuric acid do not necessarily have to be mixed with the silicate or aluminum sulphate respectively before the solutions are combined, but it is sufficient if the caustic soda and sulphuric acid be added to a reaction mixture of these components before the reaction is complete.

What is claimed is:

1. A process of preparing zeolites which comprises combining together in solution, sodium silicate, caustic soda, aluminum sulphate and sulphuric acid.

2. A process of preparing zeolites which comprises combining solutions of sodium silicate and caustic soda and of aluminum sulphate and sulphuric acid in approximately equal volumes.

3. A process of preparing zeolites which comprises reacting together sodium silicate and a soluble aluminum compound and simultaneously causing an additional neutralization reaction to take place in the mixture between non-zeolite forming acidic and alkaline substances.

4. In the process of forming a whole volume base exchanging gel by the reaction of solutions of aluminum sulfate and sodium silicate, the step which comprises reacting simultaneously with the zeolite-forming reaction a strong acid and a strong base.

ABRAHAM SIDNEY BEHRMAN.